United States Patent [19]

Clark

[11] Patent Number: 5,048,854
[45] Date of Patent: Sep. 17, 1991

[54] PIVOTING QUICK-CONNECT HITCH SYSTEM

[76] Inventor: Murrell C. Clark, Rte. 1, Box 913, Lake Village, Ark. 71653

[21] Appl. No.: 568,182

[22] Filed: Aug. 16, 1990

[51] Int. Cl.$^5$ .............................................. B60D 1/18
[52] U.S. Cl. .................................. 280/477; 280/479.3
[58] Field of Search ....... 280/477, 478.1, 479.1–479.3, 280/480, 480.1, 507, 504; 180/7.5

[56] References Cited

U.S. PATENT DOCUMENTS

| 3,542,398 | 11/1970 | Melroe | 280/477 |
| 3,734,539 | 5/1973 | Salmi | 280/477 |
| 4,073,508 | 2/1978 | George et al. | 280/478.1 |
| 4,466,632 | 8/1984 | DeVorak | 280/479.3 |
| 4,603,878 | 8/1986 | Smith, Jr. | 280/479.2 |
| 4,807,899 | 2/1989 | Belcher | 280/479.1 |
| 4,909,482 | 3/1990 | Hofmann et al. | 280/480.1 |

FOREIGN PATENT DOCUMENTS 0136017 4/1985 European Pat. Off. ......... 280/479.3

Primary Examiner—Charles A. Marmor
Assistant Examiner—Victor E. Johnson
Attorney, Agent, or Firm—Fleit, Jacobson, Cohn, Price, Holman & Stern

[57] ABSTRACT

A winch-driven hitch system for coupling trailers to tow vehicles. The system comprises a unitary frame pivotally mounted beneath the bumper of the vehicle by a rigid pivot shaft, which projects upwardly from the center of the frame. A rigid base defines a tubular cavity and a platform for mounting a winch adjacent of the cavity. The cavity slidably receives a rigid bar coupled to the trailer. Deflectors project angularly outwardly from the cavity to define a mouth for guiding the bar into alignment as it penetrates the mouth. The frame rotates in response to pressure applied by the cable when the trailer is drawn from either side of the tow vehicle. The bar comprises a tapered end, a locking orifice defined centrally through the bar, and an orificed end for receiving a trailer connector. A rigid travel-limiting stop projects upwardly between the locking orifice and the orificed end. The stop limits travel of the bar relative to the mouth to assure proper coupling. The frame pivots roughly sixty-five degrees relative to the longitudinal axis of the cavity. Rotation of the frame is limited by a rigid stop projecting upwardly from the frame. The winch cable is anchored by a hand-tied knot to facilitate repair if broken. A drop pin and a cotter pin assembly are provided to assure safe coupling and to prevent frame rotation during travel. Electrical controls for the winch are mounted remote from the hitching zone.

17 Claims, 2 Drawing Sheets

PIVOTING QUICK-CONNECT HITCH SYSTEM

BACKGROUND OF THE INVENTION

The present invention relates generally to hitch systems for coupling a trailer or draft vehicle to a tow vehicle. More specifically, the present invention relates to a unitary, winch-driven hitch assembly which may be pivotally mounted to a tow vehicle rear.

A wide variety of hitch devices are proposed in the prior art known for coupling an object to a tow vehicle. For example, it is known to provide a trailer coupling with a manual or motorized winch to assist coupling of large or heavy loads. Representative of such winch-assisted hitches are the following U.S. Pat. Nos.: Adams, Pat. No. 2,170,983, issued Aug. 29, 1939; Atkins Pat. No. 3,345,082, issued Oct. 3, 1967; Pat. No. 3,596,925, issued Aug. 3, 1971 to Richie; Pat. No. 3,761,113 issued to Smitherman on Sept. 25, 1973; Christopher Pat. No. 3,848,895 issued Nov. 19, 1974; Pat. No. 4,127,295 issued Nov. 28, 1978 to Robinson; Pat. No. 4,466,632 issued to DeVorak on Aug. 21, 1984; and, Belcher, Pat. No. 4,807,899, issued Feb. 28, 1989.

The hitch assembly disclosed in the Belcher '899 patent comprises a tubular hitch receptacle associated with a motorized winch which is bolted to the tow vehicle. The winch cable extends through the hitch receptacle and is removably coupled to an elongated hitch bar configured to conform to the interior of the hitch receptacle. The hitch bar terminates in a hitch ball or other connector coupled to the trailer In operation, the hitch bar is first linked to the draft vehicle. The cable is connected to the hitch bar, and the tongue or hitch element of the draft vehicle is then drawn by the winch into alignment with the hitch receptacle. A locking pin automatically drops into position to lock the hitch bar within the hitch receptacle.

Although the aforementioned and related prior art winch-driven assemblies greatly assist in drawing a large or bulky load into registration with the hitch, there are certain disadvantages associated with their use. For example, the winch and hitch receptacle are generally mounted as separate units. Motorized winches are typically bulky, unsightly, and generally interfere with other uses of the tow vehicle. Hand-driven winches such as that shown in the DeVorak '632 patent also typically require a great deal of additional material for complex linkages to facilitate operation of the winch crank remotely from the hitch.

A further disadvantage experienced with prior art hitches is that once mounted, such assemblies cannot be conveniently removed when needed for use on other vehicles or for other purposes. There are many situations in which it would be very useful to remove the hitch assembly from the tow vehicle and mount it to another vehicle or to a stabilized object such as a pier or a building. For example, if the tow vehicle were disabled in a ravine or the like, it would be of great benefit to remove the hitch from the tow vehicle and mount it to an operative vehicle which could then tow the disabled vehicle to safety. Or in the event it were desired to move a boat or other large object into a workshed, for example, it would be beneficial to remove the hitch from the tow vehicle and mount it to the floor or a stable object within the workshed. This would be very difficult to achieve with the use of the prior art hitches, which are typically at least partially welded in place. However, no prior art hitch known to me is so configured and/or mounted to permit convenient removal when desirable.

More importantly, prior art winch-type hitches require the operator to first generally align the trailer tongue or draft vehicle with the hitch on the tow vehicle in order to prevent undue stress on the winch during operation. Unfortunately, with most prior art hitches known to me, if the draft vehicle is positioned at a sharp angle relative to the center of the hitch, the cable may break or the winch motor may become overloaded. Many situations can be presented in which such a hitch might be of use, if not for the inability to obtain general alignment of the hitch elements on the tow and draft vehicles prior to hitching. For example, it may occur that the vehicle or object to be towed is located downhill below the tow vehicle, such as in a ravine alongside the highway. In another situation, the trailer may be positioned in a limited access area through which a tow vehicle such as a large truck cannot be easily maneuvered.

Various prior art hitch units known to me provide flexible hitch members which may be selectively directed from side to side to reach the tongue of a trailer or other draft vehicle. For example, Allen U.S. Pat. No. 4,042,254 issued Aug. 16, 1977 discloses a conical hitch housing comprising a flexible chain or cable which draws the hitch member of the draft vehicle into proper registration with the housing.

The retractable hitch assembly taught by Tate, U.S. Pat. No. 3,738,683, issued June 12, 1973, comprises a hitch receptacle mounted upon a flexible steel which may be selectively extended or retracted from a rigid bumper-mounted housing. The spring may be extended in various directions to conveniently reach the hitch of a draft vehicle. A locking pin is provided to lock the retracted receptacle within the housing for transport. The hitch elements of the tow and draft vehicles must be pulled into general alignment before the hitch can be locked. Use of this particular hitching element requires substantial physical strength and effort by the operator. Moreover, its use involves certain safety hazards, since the operator must handle the hitch elements during hitching and alignment and manually lock the hitch when a coupling is achieved.

U.S. Pat. No. 4,178,011 issued Dec. 11, 1979 to Kirsch illustrates a hitch comprising a pair of cooperating conical members. The male hitch member associated with the tow vehicle is pivotally secured to a conventional bumper-mounted ball hitch, so that it can be pivoted to align with the female hitch member permanently mounted to the trailer. A screw-driven chain draws the hitch members into registration for coupling. The device requires a special mounting to be permanently installed on the draft vehicle, and cannot be readily removed for use on another vehicle. Moreover, its use is somewhat cumbersome and involves risk to the operator, since the chain is manually driven and the operator must position himself between the vehicles to effectuate a coupling. Finally, the Kirsch '011 hitch is incapable of a wide range of pivotal movement, since the male element must be initially generally aligned with the female in order to obtain a reasonable fit.

Putnam U.S. Pat. No. 4,125,272 issued Nov. 14, 1978 discloses a pivotal hitch. The hitch comprises an elongated, rigid hitch arm pivotally coupled to a conventional body-mounted trailer hitch. The hitch arm may be pivoted to register with a rigid tubular female member permanently mounted to the trailer tongue. A lock pin drops into a locking orifice when proper penetration and alignment is achieved. While greater flexibility is afforded with the device of the '272 reference, the device requires modification of the standard ball hitch of trailers to permanently attach the female member. Thus it is difficult to easily use the hitch with other than the selected draft vehicle.

In addition, there is no provision in the latter-mentioned '272 reference for use of a winch for drawing heavy or large tow loads. Finally, although a greater range of hitch movement is provided, it is necessary that at least general alignment of the vehicle be initially achieved since the hitch arm is short and must physically contact the female member to initiate coupling.

SUMMARY OF THE INVENTION

The present invention relates to an improved, winch-driven trailer hitch system which pivots to facilitate coupling of a trailer positioned at an angle relative to the tow vehicle. The hitch preferably comprises a unitary frame which supports both the hitch mouth and a motorized winch, so that the unit can be quickly and conveniently installed for use on different tow vehicles where desired.

The system preferably comprises a generally C-shaped, rigid frame which is preferably bolted to the underside of the truck bumper. The frame is pivotally mounted by a rigid pivot shaft which projects upwardly from the center of the frame and penetrates a mounting orifice defined in the truck bumper. The frame comprises an elongated tubular cavity which slidably receives a rigid bar which may be coupled to the trailer by any conventional hitch connector. Since no special mounting is required to attach the bar to the trailer, the system can be conveniently used with various different draft vehicles.

The bar is coupled to the cable of a motorized winch so that it can be selectively extended from or retracted within the cavity. Thus, the operator can achieve a coupling without first aligning the tow vehicle with the trailer. The mouth comprises outwardly flaring deflectors and rigid internal walls which cooperate to guide the bar into proper coupling alignment as it penetrates the cavity. A rigid stop limits travel of the bar within the cavity to the correct position for coupling. When the stop strikes the frame, it provides an audible signal to the operator to turn off the winch.

The pivotal frame rotates from side to side in response to pressure exerted by the winch cable during coupling. Therefore, if the trailer is drawn from one side of the tow vehicle, the hitch frame will pivot to generally align the cavity with the bar and trailer. A rigid stop projects upwardly at the rear of the frame to limit rotation of the frame. The stop forcibly contacts the bumper or frame of the tow vehicle to limit rotation beyond roughly sixty-five degrees relative to the longitudinal axis of the cavity.

Preferably, the winch cable is anchored within an interior channel of the bar by a hand-tied knot. Thus, if the cable should break or become frayed at any time, the operator may simply remove the cable from the bar, cut off the frayed end, and reattach the bar by tying another knot in the end of the cable inserted into the channel. This arrangement also facilitates coupling the winch to other objects which do not have a connector.

After proper coupling is achieved, the frame can be locked into position for safe travel or storage by rigid drop pins and fasteners which penetrate the bumper, the frame, and the bar. For improved safety in operation, the electrical switches controlling the winch motor are preferably mounted on the side of the tow vehicle at a distance from the hitching zone.

Thus it is a fundamental object of the present invention to provide a winch-powered hitch system which can be used to couple a trailer to a tow vehicle.

A similar basic object of the present invention is to provide a unitary hitch system which can be conveniently mounted for coupling different tow vehicles to different trailers or draft objects without the necessity of special mountings.

Another fundamental object of the present invention is to provide a hitch system which is capable of achieving a proper and safe coupling without first aligning the vehicles to be coupled.

Another broad object of the present invention is to provide a hitch system which can be removably mounted to a tow vehicle and which does not interfere with other uses of the vehicle or detract from the appearance thereof.

A further object of the present invention is to provide a winch-driven hitch system which can be conveniently transferred from one tow vehicle to another.

Yet another object of the present invention is to provide a hitch system which pivots relative to the tow vehicle in order to facilitate proper coupling.

A related object of the present invention is to provide a hitch system which pivotally mounts to the bumper of a truck and is safely concealed out of reach beneath the truck frame.

A similar object of the present invention is to provide a hitch system which minimizes drag and wear on the winch cable.

Still another basic object of the present invention is to provide a safe and convenient winch-driven hitch system which can be readily repaired without special tools or equipment in the event the cable breaks.

A further object of the present invention is to provide a hitch system of the character described which can be safely operated remote from the hitching zone.

Another related object of the present invention is to provide a hitch system of the character described which can be safely locked into position to prevent inadvertent uncoupling or misalignment during travel.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION

Figure 1:
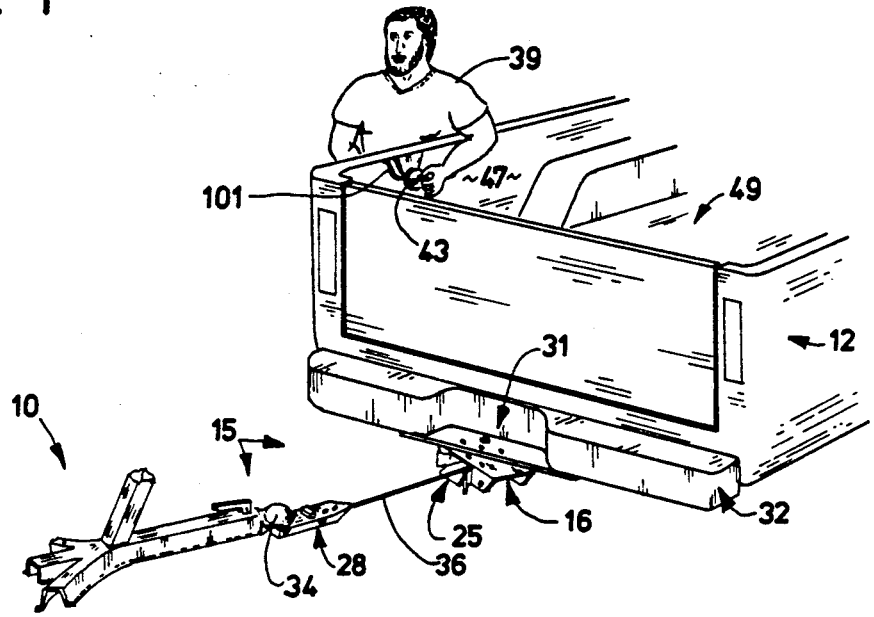
FIG. 1 is a fragmentary pictorial view illustrating the best mode of my new PIVOT HITCH SYSTEM.

With reference to the appended drawings, FIG. 1 shows the best mode of my new hitch system in use for coupling a trailer 10 to a truck 12. The system, broadly designated by the reference numeral 15, comprises a frame 16 mounted to the underside of the tow vehicle, and a rigid, removable bar 28, to which the trailer is connected. Frame 16 is preferably mounted in an inconspicuous manner beneath the hitch well 31 of the truck bumper 32. Bar 28 may be removably coupled to the connector 34 of trailer 10. Bar 28 is drawn into engagement with frame 16 by a winch-controlled cable 36. To insure the safety of the operator 39 during use, hand-operated controls 43 for activating the system 15 are preferably mounted remote from the coupling. For example, controls 43 are shown in FIG. 1 mounted on an inside wall 47 of the truck bed 49.

Figure 2:
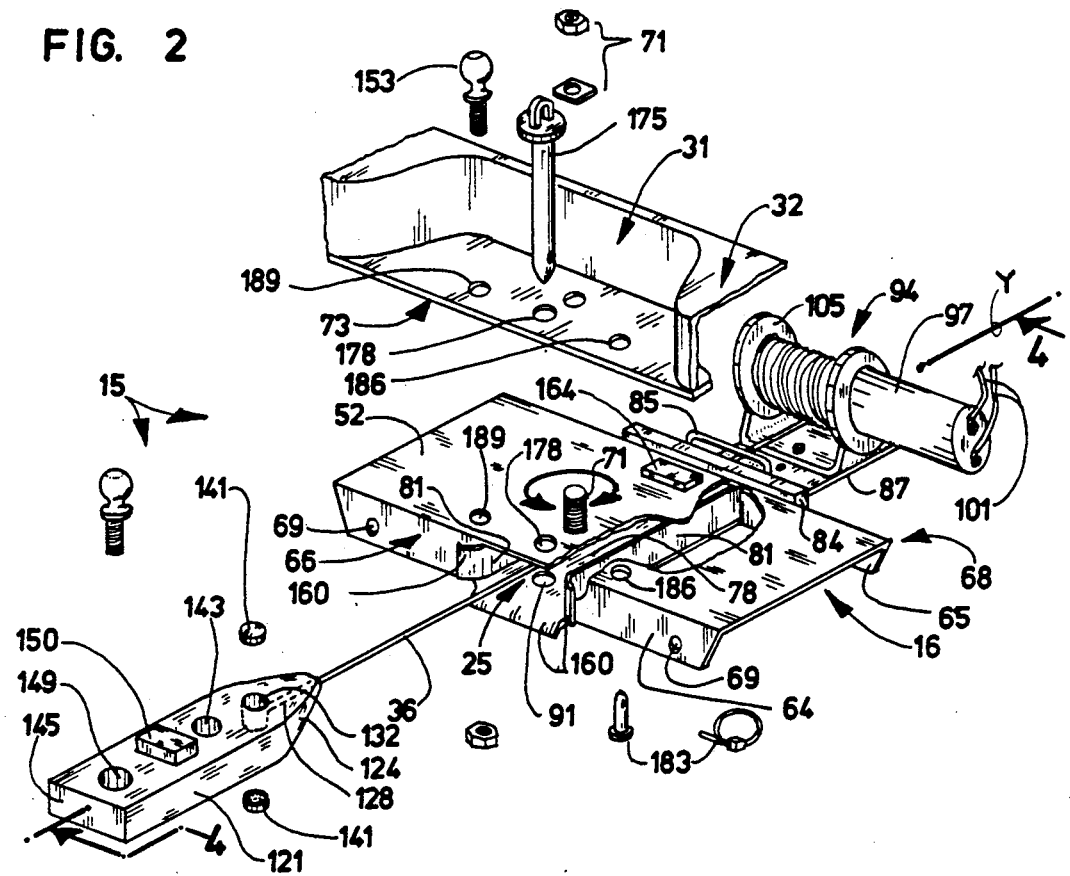
FIG. 2 is an enlarged, fragmentary exploded isometric view thereof, in which portions thereof are broken away for clarity.
Figure 3:
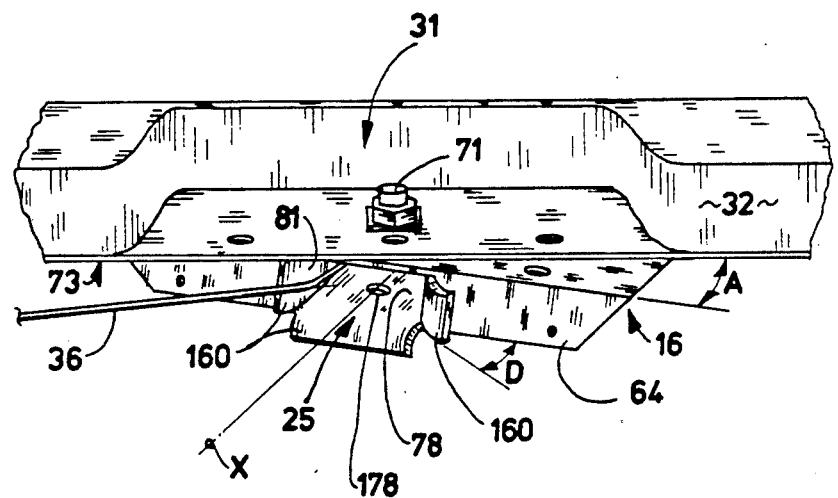
FIG. 3 is a fragmentary, front perspective view thereof.
Figure 4:
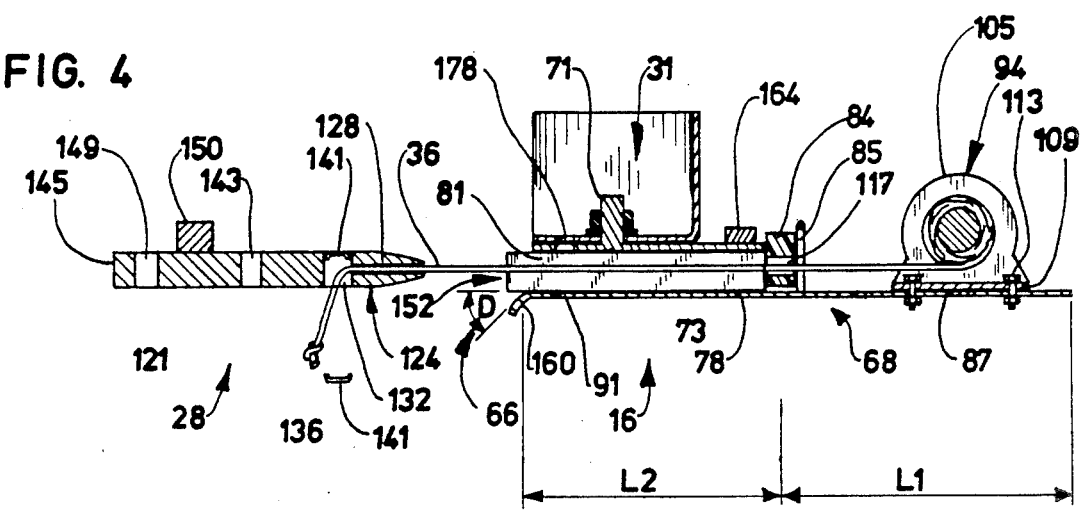
FIG. 4 is a longitudinal sectional view taken generally along line 4—4 of FIG. 2.

With reference now directed to FIGS. 2-4, frame 16 comprises a rigid plate 52 adapted to be mounted beneath the truck bumper. Plate 52 is of generally C-shaped configuration, having a pair of rigid flanges 64 extending integrally downwardly from frame front 66 and flanges 65 extending integrally downwardly from the frame rear 68. Flanges 64, 65 stabilize the frame for pivotal movement, and are drilled with appropriate orifices 69 for selectively receiving accessory hitch links such as chains or hooks conventionally used to secure a hitch.

As best viewed in FIG. 3, plate 52 is pivotally mounted to the underside of the hitch well 31 by a rigid pivot shaft, preferably comprising a bolt and lockwasher assembly 71. Shaft 71 defines a pivot point for the frame 16, and the underside 73 of hitch well 31 provides a sliding surface for plate 52 as the frame 16 pivots as explained in detail hereinafter. Shaft 71 is preferably welded to the upper surface of plate 52, roughly in the center of the frame. Importantly, shaft 71 does not penetrate plate 52 and thus does not interfere with the operation of the system.

An elongated, tubular cavity 25 is defined beneath plate 52 by a rigid, elongated base 78. As best viewed in FIG. 2, base 78 is maintained in spaced-apart, parallel relation to plate 52 by a pair of rigid internal walls 81. Base 78 and internal walls 81 are preferably permanently joined and fastened to plate 52 by welding. A resilient dust shield 84 seals cavity 25 at the rear 68 of frame 16. Shield 84 is firmly held in position by a rigid retainer 85. Thus cavity 25 is generally shielded from the deleterious effects of the elements which could interfere with proper operation of the hitch system.

As best viewed in FIG. 4, base 78 extends from flanges 64 at plate front 66 rearwardly toward the plate rear 68 beyond flanges 65. A locking orifice 91 permits the system to be locked as described hereinafter. Base 78 defines an integral mounting platform 87 which extends underneath the truck bed behind the hitch well 31 (FIG. 4). The length L1 of the mounting platform 87 portion of the base 78 is preferably roughly equal to the length L2 of the base defining cavity 25. Platform 87 supports a motorized winch assembly, generally designated by the reference numeral 94.

Winch assembly 94 is preferably a compact unit such as the Model XZ winch produced by Superwinch, Inc., or similar device. As best viewed in FIG. 2, assembly 94 comprises an electric motor 97 remotely controlled via wires 101, a rotatable winch drum 105, and cable 36, preferably at least twenty-five feet in length. The assembly 94 further comprises integral, generally planar mounting tabs 109 for receiving suitable fasteners 113 such as bolts or the like, which are secured to mounting platform 87. As best viewed in FIG. 4, the winch assembly 94 is safely concealed beneath the truck bed 49 when the frame is properly mounted. Thus the assembly is generally protected from the elements and the risk of injury to the operator 39 from contact with the assembly is minimized.

Winch control 43 preferably comprises a dash-mount remote control kit, such as that currently marketed by Superwinch, Inc., which can be conveniently mounted anywhere on the tow vehicle. Preferably the controls will be positioned on an inside wall 47 of the truck bed 49, so that the operator 39 stands clear of the hitching zone during operation. Thus injuries typically associated with the operation of hitches will be avoided.

With reference to FIGS. 2 and 4, the winch cable 36 extends from drum 105 through a narrow inlet 117 of shield 84 and outwardly through cavity 25. The end of cable 36 is preferably anchored within the rigid trailer-coupling bar 28.

Bar 28 comprises a rigid, elongated, generally rectangular body 121 terminating in an inwardly tapering front end 124. Front end 124 comprises a longitudinal, elongated, cable-receptive bore 128 which terminates in channel 132. Preferably bore 128 is defined along the longitudinal axis Y of the bar. The cable 36 is manually threaded through bore 128 and drawn outwardly through channel 132. Preferably a hand-tied knot 136 is used to secure the end of the cable within channel 132. Once secured, the cable is retracted within channel 132, which is subsequently sealed with removable plugs or caps 141. This knot arrangement has proven extremely advantageous, since it permits quick and convenient repair without special tools in the event the cable is broken during use. If a special fastener or fitting is used, the operator would have to transfer the fastener from the broken portion of the cable and reinstall it to the remaining length of cable.

With the present knot-secured system, the operator must merely remove the plugs 141, cut the cable end smooth and thread it through bore 128 into channel 132, tie a knot 136, and seal the knot within the channel by replacing plugs 141. Additionally, when it is desired to use the system for winching an object which does not have a conventional hitch connector, the cable may be quickly removed from the bar and tied to or around the object to be towed.

A locking orifice 143 is defined roughly through the center of bar 28. As described hereafter, orifice 143 is adapted to register with corresponding locking orifices 91 of base 78 and 178 of frame when the bar is properly aligned for coupling. The outer end 145 of bar 28 comprises an orifice 149 for receiving a suitable connector such as a hitch ball 153, hook, or bar. For example, in FIG. 1, the system is shown in use with a trailer having a conventional ball-hitch receptacle 34. A ball 153 is typically stored in the hitch well 31 and can be quickly installed within orifice 149 as needed. Orifice 149 may also be coupled to any of a variety of connectors, such as a hook-type hitch, rope, or chain. Where necessary, additional pulling strength may be afforded by extending cable 36 through channel 132 and through orifice 149, looping it around an object to be towed, and anchoring it within orifice 149 by a knot or fastener. When the bar 28 is properly attached to the trailer 10, the winch assembly 94 may be activated to draw the bar 28 into cavity 25.

A rigid travel-limiting stop 150 projects upwardly from bar 28 roughly halfway between locking orifice 143 and connector orifice 149. Bar 28 penetrates mouth 152 and slides along cavity 25 deflected by internal walls 81 until it reaches a position in which proper registration of the locking orifice 143 with orifices 91, 178 is achieved. At that point, stop 150 forcibly contacts the front 66 of plate 52 to prevent the bar from penetrating mouth 152 past the point of proper alignment. The sound produced when the stop 150 strikes plate 52 signals the remote operator 39 that coupling is complete so that he may timely deactivate the winch motor 97.

Cavity 25 comprises outwardly flaring deflectors 160 which form a mouth 152 for receiving bar 28 in proper alignment with the internal cavity 25. The tapered front end 124 of the bar is deflected by deflectors 160 as the bar approaches the mouth 152. Preferably deflectors 160 extend outwardly from flange 64 at an angle D of roughly forty-five degrees. This forty-five degree angle has proven advantageous, because when the bar 28 enters from the side of mouth 152, its front end 124 will be deflected directly to the center of the mouth 152, or the longitudinal axis X of cavity 25. If the deflectors are angled at a lesser degree, the front end 124 is deflected against the opposite side wall. The bar may then hang behind one deflector between the deflector and the frame, or lodge substantially sideways between the deflectors, requiring operator intervention. A greater angle would so greatly narrow the mouth that the bar 28 would not be permitted to enter unless the vehicles were generally longitudinally aligned prior to coupling. Positioning the deflectors at forty-five degree angle relative to plate 52 thus facilitates proper coupling without requiring prior alignment of the vehicles. The operator is thus spared substantial time and effort. Additional time and effort savings are gained by virtue of the pivotal mounting of the system 15.

The pivotal mounting facilitates proper coupling even when the trailer 10 is positioned to the side of or downhill from the tow vehicle. For example, if the trailer 10 had fallen into a ravine by the roadside, it would be nearly impossible to achieve prior alignment of the trailer and truck connectors. With the present system, the cable 36 is extended until the bar 28 can be securely coupled to the trailer. When the winch is activated, the cable will tighten and begin to draw the trailer toward the hitch. As best illustrated in FIG. 3, the cable presses against internal wall 81 and deflector 160 as it tightens. The pressure thus exerted will cause the frame 16 to pivot to one side about the pivot point defined by bolt 71. As the frame 16 pivots, plate 52 slides along the underside 73 of the hitch well, one side rotating inwardly beneath the bumper, the opposite side rotating outwardly away from the bumper. The plate is stabilized during rotation by flanges 64, 65.

A rigid stop 164 projects upwardly near the rear 68 of plate 52. Stop 164 limits rotation of the frame. As best viewed in FIG. 4, stop 164 will contact the rear wall of hitch well 31 or bumper as the frame 16 pivots to either side. Ideally, the frame 16 rotates roughly sixty-five degrees to either side, as defined at arc A, or a total of roughly one hundred thirty degrees relative to the longitudinal axis X of cavity 25. Based on my experimentation, a lesser degree of rotation would not afford the desired result, since it would require substantial alignment of the truck and trailer prior to coupling. If greater freedom of rotation were permitted, for example, if no stop 164 were provided, the frame would freely rotate until the platform 87 strikes the bumper or hitch well. However, the winch assembly 94 would be subject to damage from such impacts against the frame. Moreover, if free rotation of the frame were permitted, the winch cable would be permitted to slide across frame flanges 64 when drawing a vehicle from the side of the truck, and could be broken or frayed. Hence, the selected sixty-five degree pivot is ideal for the present system.

As the bar 28 approaches mouth 152, its tapered front end is deflected by deflectors 160 and the bar is guided along side walls 81 until proper alignment of the bar within cavity 25 is achieved. When complete registration of locking orifices 91, 143, and 178 is achieved, stop 150 of bar 28 strikes plate 52, producing an audible signal to the operator that coupling is complete.

When the coupling is thus complete, the bar 28 may be locked into mouth 25 for safety during travel. A rigid locking pin 175, chain, or other locking device, may be inserted into appropriate registering orifices 178 defined through the truck well and plate 78, orifice 91 of base 78, and orifice 143 of bar 28. Additionally, a cotter pin assembly 183 or similar fastener penetrates an appropriate locking orifice 186 to prevent undesired rotation of the frame 16 during travel. Preferably the cotter pin assembly 183 may be employed to inconspicuously lock the frame beneath the truck bumper when the system is disassembled and not in use. Where desired, accessory chains or hooks may coupled from the trailer to orifices 69 in flanges 64. Finally, a third orifice 189 may be provided to receive the shaft of the stored hitch ball 153. The ball 153 then further assists to prevent undesired rotation of the frame 16 during travel or non-use.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A hitch system for coupling a trailer to a two vehicle, said system comprising a rigid frame comprising a cavity and a mouth opening into said cavity, a rigid, removable bar to which said trailer may be selectively attached, means for pivotally mounting said frame to said tow vehicle, means for limiting pivoting of said frame relative to said two vehicle, winch means having a cable connected thereto for drawing said bar into said cavity thereby coupling said trailer to said system, and, a means for selectively locking said bar within said cavity, said frame comprising a rigid plate adapted to contact an underside of the two vehicle, and a lower base projecting away from said mouth generally parallel with and rigidly connected with said plate, said base forming a platform for mounting said winch means with the cable passing through the cavity.

2. The system as defined in claim 1 wherein said base is secured relative to said plate by a pair of rigid, internal walls, said base, said plate and said internal walls together defining said cavity.

3. The system as defined in claim 2 wherein said frame comprises upwardly extending stop means for limiting pivotal movement of said frame by contact with a portion of an underside of said tow vehicle.

4. The system as defined in claim 3 wherein said bar comprises rigid stop means for limiting travel of said bar within said cavity when said bar is drawn through said mouth by contacting said plate.

5. The system as defined in claim 4 wherein said means for pivotally mounting said frame comprises a rigid pivot shaft extending upwardly from said frame roughly at a center of said frame above said cavity for penetrating a bumper on said vehicle.

6. The system as defined in claim 5 wherein said mouth comprises outwardly projecting deflectors, and said bar comprises a tapered end which slidably contacts said deflectors, whereby said bar is maintained in centered alignment as it penetrates said mouth.

7. The combination as defined in claim 3 wherein frame pivots only approximately 130 degrees.

8. The combination as defined in claim 1 wherein said bar comprises a tapered end and a spaced apart orificed end for receiving a hitch connector.

9. The combination as defined in claim 8 wherein said tapered end comprises a longitudinal cable-receptive bore terminating in a channel within which said cable may be temporarily anchored.

10. The combination as defined in claim 9 wherein said assembly comprises means for temporarily locking said frame against pivotal movement and drop pin means for penetrating said frame, said bar, and said base when said bar means is disposed in predetermined position within said cavity.

11. The combination as defined in claim 10 wherein said bar means comprises a locking orifice roughly centered between said tapered end and said orificed end.

12. A winch-driven hitch assembly for pivotal mounting to a truck rear bumper for expediting trailer alignment and hook-up, said assembly comprising:
a rigid frame plate pivotally secured to an underside of said bumper by a rigid pivot shaft;
a planar frame base attached to and spaced apart from said plate by rigid internal side walls;
a cavity defined beneath said shaft and between said plate and said base, and between said side walls;
a rigid mounting platform integral with said base projecting away from said cavity beneath said truck;
outwardly flaring deflectors forming a mouth into said cavity;
stop means projecting upwardly from said plate for limiting pivotal movement of said assembly by contacting an underside of said truck bumper;
winch means comprising an elongated cable, said winch means mounted to said assembly upon said platform beneath said tow vehicle;
means for temporarily locking said assembly against pivotal movement;
bar means for receiving a trailer, said bar means removably connected by said cable to said assembly and selectively retractable through said mouth into said cavity by said winch means, said bar means comprising a rigid stop for limiting travel through said mouth; and,
drop pin means for penetrating said cavity, said plate, said bar means, and said base when said bar means is disposed in predetermined position within said cavity.

13. The combination as defined in claim 12 wherein said bar means comprises a tapered end, a spaced apart orificed end for receiving a hitch connector, and a locking orifice for receiving said drop pin means, said tapered end comprising a cable-receptive bore terminating in a channel within which said cable may be temporarily anchored by a hand-tied knot, and said bar means stop projecting upwardly from said bar centrally between said locking orifice and said orificed end.

14. The combination as defined in claim 13 wherein said stop of said frame limits rotation of said frame to roughly sixty-five degrees to either side.

15. The combination as defined in claim 14 wherein said pivot shaft projects upwardly from the center of said frame plate above said cavity, penetrates a mounting orifice defined in said bumper, and is secured by a locking washer assembly.

16. In combination, a tow vehicle having a rigidly mounted towing member mounted thereto, a trailing vehicle, and a hitch assembly coupling said trailing vehicle to said two vehicle, said hitch assembly comprising a bar connected with the trailing vehicle, frame means, means pivotally supporting said frame means from the towing member on the tow vehicle for pivotal movement about a vertical axis, said frame means including a longitudinally extending cavity forming means telescopically receiving said bar, means releasably locking the bar in the cavity forming means, a cable extending through the cavity forming means and having one end connected with said bar, winch means mounted on said frame means and positioned in spaced aligned relation to the cavity forming means, said winch means including a reel with the cable mounted thereon to move the cable through said cavity forming means, said frame means including a support plate rigid with said frame means for pivotal movement therewith and supporting the winch means to enable the cavity forming means, winch means and cable to pivot about a vertical axis toward a position aligned with the bar when the cable is pulling the bar toward and into the cavity forming means.

17. The combination as defined in claim 16 wherein said tow vehicle includes a rear bumper and said towing member includes a support well rigid with the bumper, said frame means including a horizontally disposed plate underlying the support well in surface-to-surface engagement, said means pivotally supporting said frame means including a pivot shaft interconnecting said plate and support well, said cavity forming means including said plate, depending side walls rigid with the plate and a base spaced below said plate and rigid with the side walls to define a longitudinally extending cavity having an entrance end facing longitudinally outwardly from the support well and bumper, said support plate being rigid with and forming a continuation of the base at an end of the base remote from the mouth of the cavity, said winch means being mounted on the support plate in spaced relation to said horizontal plate thereby maintaining a constant relation between the winch means, reel, cable and frame means with the cable extending through the cavity, means limiting pivotal movement of the frame means and winch means in both directions of pivotal movement of the frame means about the vertical axis to limit the angular displacement of the frame means and cavity from a position with the longitudinal axis of the cavity being perpendicular to the lengthwise dimension of the bumper, said side walls and base including outwardly flared ends forming the mouth of the cavity, said bar including a tapered end connected with the cable for entering the mouth of the cavity with the outwardly flared ends of the walls and base guiding the bar into the cavity with tension on the cable causing the frame means, winch means and cable to pivot about said pivot shaft toward a position aligned with the bar when tension is exerted on the cable, said bar and frame means including engaging stop means to limit movement of the bar into the cavity, removable pin means releasably locking said bar in said cavity to provide a connection between the bar and frame means independent of the cable.

* * * * *